United States Patent [19]
Assaf

[11] Patent Number: 4,704,189
[45] Date of Patent: Nov. 3, 1987

[54] METHOD OF EVAPORATING LIQUID FROM A SOLUTION

[75] Inventor: Gad Assaf, Rehovot, Israel

[73] Assignee: Geophysical Engineering Company, Seattle, Wash.

[21] Appl. No.: 609,312

[22] Filed: May 11, 1984

Related U.S. Application Data

[63] Continuation-in-part of Ser. No. 357,661, Mar. 12, 1982, abandoned.

[51] Int. Cl.[4] ............................ B01D 1/00; B01D 1/16
[52] U.S. Cl. .................................... 159/48.2; 159/49; 159/902; 159/DIG. 28
[58] Field of Search ...................... 159/902, 903, 3, 5, 159/13.1, 47.1, 48.1, 48.2, 49, DIG. 28; 23/293 A, 295 R, 295 S

[56] References Cited

U.S. PATENT DOCUMENTS

| | | | |
|---|---|---|---|
| 874,907 | 12/1907 | Frasch | 159/48.2 |
| 1,544,130 | 6/1925 | Christensen | 159/48.2 |
| 2,863,808 | 12/1958 | Markels | 159/13.1 |
| 3,463,215 | 8/1969 | Pinkerton et al. | 159/DIG. 28 |
| 3,860,492 | 1/1975 | Lowi et al. | 159/13.1 |
| 3,964,960 | 6/1976 | Marans | 159/49 |
| 3,992,246 | 11/1976 | Welch | 159/13.1 |
| 4,323,424 | 4/1982 | Secunda et al. | 159/48.1 |
| 4,334,886 | 6/1982 | Tani et al. | 159/15 |
| 4,351,849 | 9/1982 | Meade | 426/61 |

*Primary Examiner*—S. Leon Bashore
*Assistant Examiner*—Andrew J. Anderson
*Attorney, Agent, or Firm*—Sandler & Greenblum

[57] ABSTRACT

A starting solution is concentrated to a desired end solution by contacting the starting solution with a gaseous medium under the conditions that the heat content of the starting solution in contact with the gaseous medium is smaller than the heat content of the medium, and the duration of contacting is such that most of the solution that evaporates does so under conditions of constant enthalpy. When the starting solution is a brine, and the gaseous medium is air whose relative humidity is less than the relative humidity at the air/brine interface, the brine can be sprayed into the air to form a shower of droplets within which heat and vapor transfer take place during the transit time of the droplets in the air. When the ratio of droplets to air is sufficiently small, the heat content of the droplets is much smaller than the heat content of the air. When the temperature of the brine exceeds the wet-bulb temperature of the air, the latent heat flux is greater than the sensible heat flux, and the temperature of the droplets rapidly approaches the wet-bulb temperature of the air as the droplets are cooled by evaporation. Once the wet-bulb temperature at the air/brine surface is substantially equal to the wet-bulb temperature of the air, a different process takes place, wherein the latent heat flux is substantially equal to the sensible heat flux, and the temperature of the brine approaches the temperature of the air without involving a change in enthalpy.

31 Claims, 8 Drawing Figures

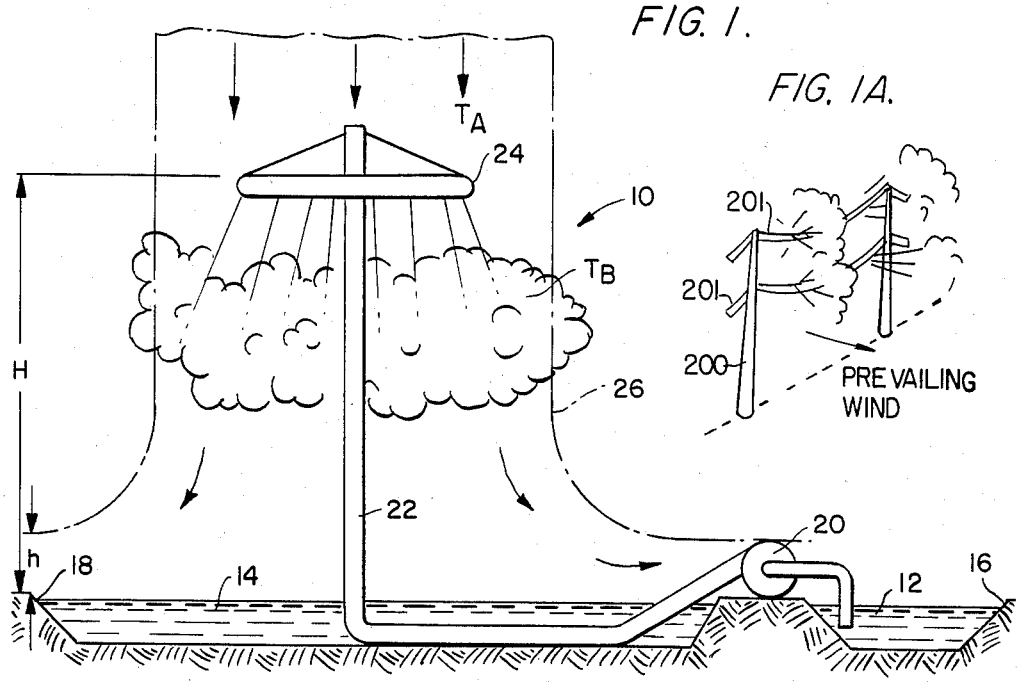
FIG. 1.
FIG. 1A.
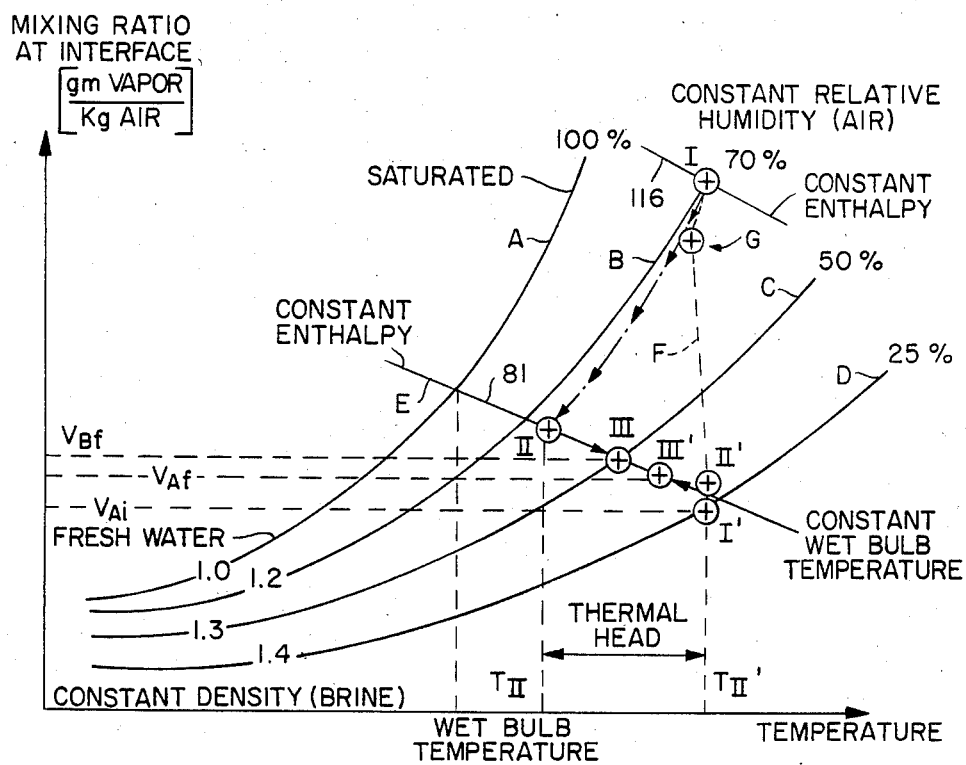
FIG. 2.

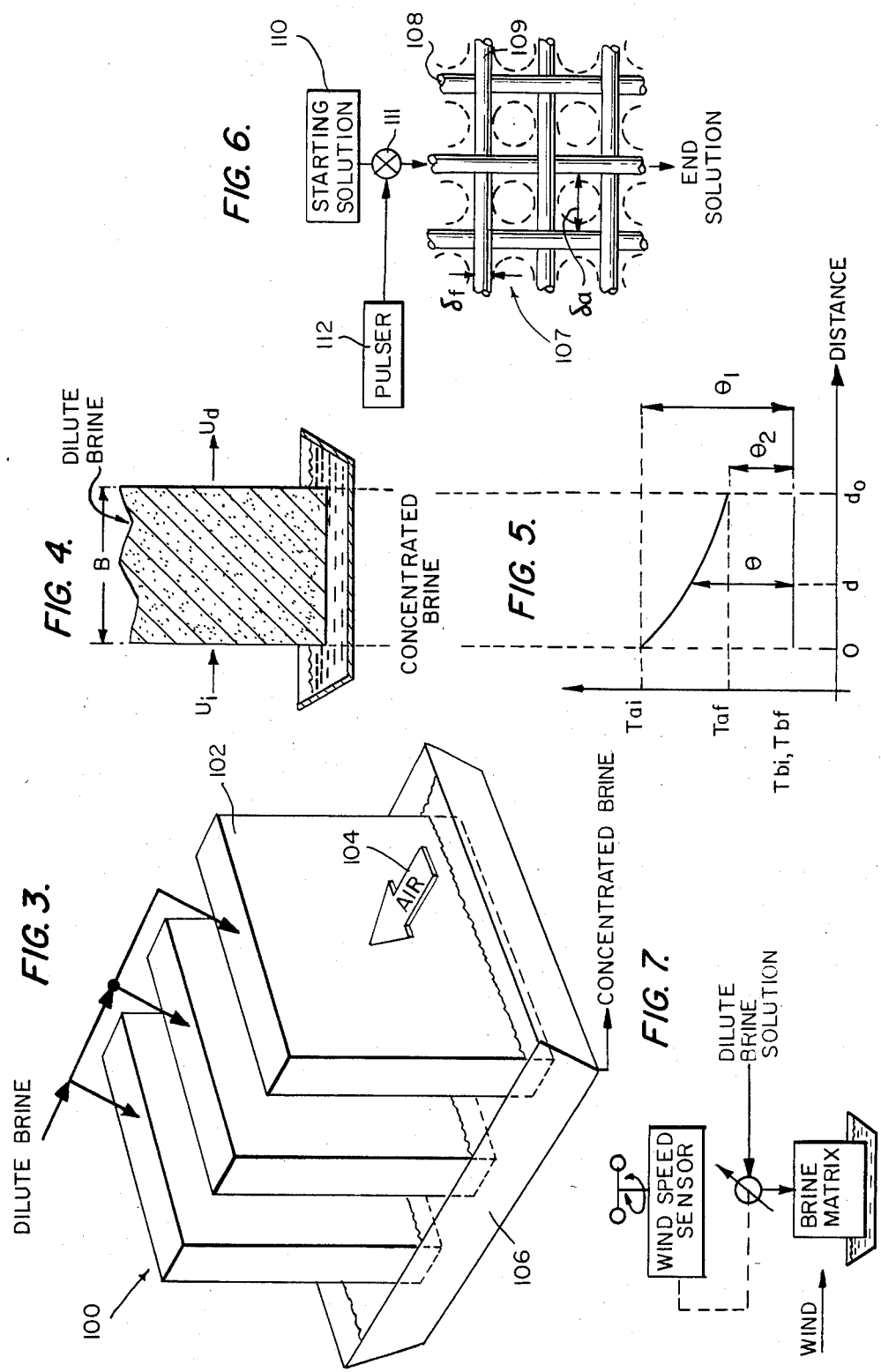

METHOD OF EVAPORATING LIQUID FROM A SOLUTION

RELATED APPLICATION

This application is a continuation-in-part of copending application Ser. No. 357,661 filed Mar. 12, 1982, now abandoned.

TECHNICAL FIELD

This application relates to a method of and means for evaporating liquid from a solution to concentrate it, or to precipitate solids that are dissolved or suspended in the liquid.

BACKGROUND OF THE INVENTION

Commercial recovery of valuable minerals, such as potash, from brine solutions is carried out in many parts of the world by establishing large-scale evaporating ponds. For example, the production of minerals from the Dead Sea is based on evaporating ponds whose total area exceeds 130 Km$^2$. Solar radiation absorbed by these ponds supplies latent heat of evaporation, thus allowing successive ponds to become progressively more concentrated, until the desired minerals precipitate and can be harvested.

Because the vapor pressure of brine decreases with increasing concentration, and is small in comparison with fresh water at the same temperature, evaporation is retarded as the brine concentration increases. Considering the Dead Sea as an example, the annual evaportion of water from Dead Sea brine varies between 1.4 and 0.7 m. per year, depending on the concentration of the brine, while about 2.2 m. per year is evaporated from fresh-water ponds in the same region.

Absorption of solar radiation by an evaporating pond raises the temperature of the brine therein until evaporation takes place and a steady-state condition is established. The elevated temperature of the pond increases the sensible and long-wave radiation flux from the ponds to a level that exceeds the latent heat flux that produces evaporation and concentration of brine. Thus, only a fraction of the solar energy input to an evaporating pond is converted into useful latent heat flux. Commercial production of useful minerals by evaporating ponds is thus inefficient in its use of solar energy, and is limited by the area availble for the evaporating ponds.

A need exists, therefore, for a technique that is more effective than conventional evaporating ponds for evaporating water from brine in order to increase production of useful minerals without increasing the area dedicated to their production.

As noted in U.S. Pat. No. 4,351,849 (the disclosure of which is hereby incorporated by reference), food, cosmetic and other industries are also heavily engaged in processes that evaporate liquids from solutions to concentrate the latter, or to precipitate solids from the solutions. As described in the '849 patent, the drying process involves a starting solution containing solids dissolved or suspended therein, and a gaseous drying atmosphere whose temperature, pressure, and vapor content establish a condition in which the atmosphere is capable of absorbing a substantial quantity of liquid from the starting solution. Normally, the gaseous drying atmosphere is air that is heated substantially above room temperature; and the drying process is carried out by dispersing the liquid to be dried in the drying atmosphere as droplets small enough so that the liquid component of the droplets will be evaporated readily. When the starting solution is a food product such as a bakery mix product, vegetable or fruit juice, or milk or a diary product, the suspension liquid, ordinarily, is water. Where the starting solution is a chemical, the suspension liquid may be a non-polar organic solvent such as a hydrocarbon liquid or other petroleum derivative, aldehyde, ketone or other solvent known in the art.

Solids contained in the starting liquid may comprise dissolved solids present as a true solution as well as colloidal and non-colloidal suspensions of insoluble material. Thus, the term "solid" is used herein to include suspended material which sometimes exist as a liquid (e.g., fat, in the cse of a dairy product). Such material may be chemically pure of may be a mixture.

As explained in the '849 patent, the temperature of the drying atmosphere must be high enought to enable the drying atmosphere to hold a substantial quantity of liquid or solvent being evaporated. But, the temperature should not be so high that it will cause chemical degradation or decomposition of the material being dried. Drying heat sensitive products, particularly food products, using known techniques exemplified in the '849 patent, often produces products whose appearance, taste, and other properties are affected adversely.

A need exists, therefore, for a drying technique that does not require heating of the gaseous atmosphere to temperatures in excess of those that adversely affect the quality of the resultant dried material, yet effectively and quickly removes liquid from the starting solution.

DISCLOSURE OF INVENTION

According to the present invention, a starting solution is concentrated to a desired end solution by contacting the starting solution with a gaseous medium without the necessity for the addition of external heat to the medium. To this end, the starting solution is contacted with the gaseous medium under the conditions that the heat content of the starting solution is smaller than the heat content of the medium, and the duration of contacting is such that most of the liquid that evaporates does so under conditions of constant enthalpy. During initial contact between the starting solution and the gaseous medium, the temperature of the solution rapidly approaches the wet bulb temperature of the gaseous medium as the solution is cooled by evaporation (if the temperature of the starting solution exceeds the wet-bulb temperature), or is heated by condensation of vapor from the gaseous medium (if the temperature of the starting solution is less than the wet-bult temperature). The amount of liquid that evaporates from, or that condenses on, the starting liquid as the temperature thereof approaches the wet-bulb temperature of the gaseous medium is relatively small, causing only a small change in concentration of the starting solution, the difference between the latend heat flux and the sensible heat flux being the driving force behind the change in temperature of the starting solution.

The starting solution may be contacted with the gaseous medium by spraying the solution into the medium, or by passing the medium through a matrix of filaments over which a thin film of the solution flows. In the former case, the mixing ratio (kilograms of starting solution per kilogram of gaseous medium) should not exceed about 0.02. In the latter case, the product of the drag coefficient of the matrix, and the areal ratio (i.e., the ratio of the projected area of the filaments to the cross-sectional area of the matrix) should be selected so as to maximize the transfer of heat; and the thickness of the matrix should be such that the ratio of the difference between the gaseous temperature and the solution temperature from inlet to exit side of the matrix is about 2.5.

Advantageously, the matrix may be in the form of a planar criss-cross net or screen of filaments of jute or plastic. In such case, there is a threshold flow rate of starting solution (in terms of volume of solution per second per unit area of matrix) at which a flow greater than the threshold causes a film of solution to bridge the interstices of the screen. Air flow through the screen is thus suppressed, and evaporation efficiency is reduced considerably. To solve this problem, the present invention applies starting solution itnermittently, i.e., in pulses.

Once the wet-bulb temperature at the gas/liquid interface is substantially equal to the wet-bulb temperature of the bulk of the gaseous medium, a different process takes place wherein the latent heat flux due to evaporation of solvent from the liquid is substantially equal to the sensible heat flux of the gaseous medium. That is to say, the wet-bulb temperature at the gas/liquid interface remains substantially equal to the wet-bulb temperature of the bulk of the gaseous medium as the temperature of the droplets increases simultaneously with a decrease in the temperature of the gaseous medium. During the second process described above in which the temperature of the gaseous medium approaches the temperature of the liquid at the wet bulb temperature of the gaseous medium, the heat and vapor transfer takes place under constant-enthalpy conditions. During this second process, the concentration of the liquid increases significantly as compared to the change in concentration during the first process.

The resident time that a unit mass of gas interacts with the spray can be controlled by two parameters of the system: droplet size and distance through which the spray travels. Preferably, the system parameters are selected such that the resident time is made comparable to the time constant of the system, the latter being the time required for the temperature difference between the liquid and gas to reach $1/e$ (i.e., about 37%) of the thermal head, which is the difference between the temperature of the liquid and the temperature of the gas at the start of the second process. When the resident time is comparable to the time constant of the system, the upper limit on the radius of the droplets is about 0.2 mm; and this will require a distance through which the spray must travel to exceed 5m.

When the spray process described above is carried out in the natural environment, i.e., the spraying occurs in the open air, naturally occurring, horizontally directed winds, almost always, will be present. Such winds will introduce dry air into the shower thereby enhancing evaporation and making the shower more effective in evaporating liquid. Thus, the height requirements for the shower are reduced. In this regard, where prevailing winds have a preferential direction, line showers may be utilized instead of umbrella showers. Such line showers include towers between which are strung conduits carrying spray nozzles.

When the starting solution is applied to a matrix of filaments, the mass flow of the gaseous medium through the matrix should be of the order of 100 times the mass flow of solution; and often, a blower may be utilized to intensify the evaporation. Moreover, the resident time of the solution in contact with the gaseous medium will depend in part on the thickness of the matrix and its vertical dimension when gravity feed of the solution is employed.

The matrix process, as well as the shower process, can be carried out in the open air such that the prevailing wind provides for the movement of air through the matrix of filaments. In order to maximize the efficiency of the system, the air speed can be detected in a conventional manner and used to modulate a flow meter by which the starting solution, e.g., dilute brine, is applied to the matrix thereby relating flow rate of solution to wind speed.

BRIEF DESCRIPTION OF THE DRAWINGS

An embodiment of the invention is described below by way of example, and with reference to the accompanying drawings, wherein:

FIG. 1 is a schematic of one embodiment of the present invention showing the spraying of brine into air for the purpose of concentrating the brine;

FIG. 1A is a perspective schematic of another embodiment showing the spraying of brine into air using a line shower;

FIG. 2 is a psychrometric chart into which the states of both the brine and air are incorporated;

FIG. 3 is a schematic of another embodiment of the invention showing the contacting of a starting solution with a gaseous medium for the purpose of concentrating the starting solution to and end solution that is more concentrated than the starting solution;

FIG. 4 is a side view of one of the pads shown in Fig. 3;

FIG. 5 is a graph that shows the variation in temperature of the gaseous medium and the solution as a function of the location in a pad of the type shown in Fig. 4; and FIG. 6 is a fragment of a planar screen of crisscrossed filaments showing the intermittent application of starting solution to the screen; and FIG. 7 is a block diagram of another emdodiment of the invention for relating the flow rate of solution to be dried to speed of the gaseous medium relative to the wets pads.

DETAILED DESCRIPTION

Referring now to FIG. 1 of the drawings, reference numeral 10 designates apparatus according to the present invention for converting starting brine 12 into end brine 14. Apparatus 10 includes a source of starting brine 12 contained in reservoir 16, which can represent the ocean, and second reservoir 18, which represents a catch basin for receiving end brine 14. Pump 20 draws brine from reservoir 16, and supplies this brine through vertically-oriented pipe 22 to spray hed 24, located at an elevation H above the surface of the second reservoir. The pressure drop $H_n$ across the nozzles (not shown) associated with spray hed 24 is chosen so as to produce droplets of a diameter less than a predetermined maximum, which is described below, and to establish a mixing ratio measured in terms of kilograms of vapor per kilogram of air which is less than a predetermined value, as described below. The drag force on the air due to the falling droplets and the increase in density of the air due to its cooling establish downwardly-flowing air column 26. As the droplets fall from spray head 24 into reservoir 18, the density of the droplets increases, reaching the predetermined end point just as the droplets enter the reservoir. By selecting the parameters of the system, namely, the mixing ratio, droplet size, and the height of the spray heads, the desired end brine will be produced in the reservoir. The desired precipitants associated with this end brine can be harvested from the reservoir.

From heat-exchange theory, the rate at which the temperature of the air changes is related to the temperature of the air and the temperature of the brine due to the interaction between the droplets and the air as follows:

$$dT_A/dt = (T_B - T_A)/\tau \qquad (1)$$

where $T_A$ is the temperature of the air, $T_B$ is the temperature of the brine, and $\tau$ is the time constant of the system, and is as follows:

$$\tau = [(2\rho_B)/3\rho_A Nu K](r^2/m_B) \qquad (2)$$

where $\rho_B$ is the density of the brine, $\rho_A$ is the density of the air, Nu is the Nusselt number for the heat transfer between the brine and the air, and is a function of the radius of the droplets, K is the kinematic diffusivity of the air, r is the radius of the droplets, and $m_B$ is the brine-air mixing ratio, kilograms of brine per kilogram of air. The time constant of the system is the time required for the temperature difference between the brine and air to reach 1/e of the thermal head, which is the difference between the ambient air temperature and the temperature of the brine entering the droplet environment. By integrating Eq. (1), the following result is obtained:

$$T_{Ai} - T_{Af} = (T_{Ai} - T_{Bf})[1 - \exp(-t/\tau)] \qquad (3)$$

The analogue of Eq. (3) can be rewritten in terms of vapor mixing ratios as follows:

$$V_{Af} - V_{Ai} = (V_{Bf} - V_{Ai})[1 - \exp(-t/\tau)] \qquad (4)$$

where $T_{Ai}$ is the air temperature at its initial state, $T_{Af}$ is the air temperature at its final state, $T_{Bf}$ is the brine temperature at its final state, $V_{Af}$ is the vapor mixing ratio of air at the final state, $V_{Ai}$ is the vapor mixing ratio of air at the initial state, and $V_{Bf}$ is the vapor mixing ratio of the brine surface at its final state.

From conservation of mass, namely, the water, liquid, and the evaporation, the following result is achieved:

$$\Delta W/W = (W_{Bf} - W_{Bi})/W_{Bf} \qquad (5)$$
$$= (V_{Bf} - V_{Ai})/[m_B/(1 + w_B/w_A)][1 - \exp(-t/\tau)]$$

where $W_{Bf}$ is the mass fraction of water in the brine in its final state, $W_{Bi}$ is the mass fraction of water in the brine in its initial state, $w_B$ is the drift velocity of the droplets (i.e., the relative velocity of the droplets with respect to the air), and $w_A$ is the velocity of the air mass. From inspection of Eq. (5), the limit of the percentage change in mass of water in a droplet when t is much greater than $\tau$ and the drift velocity is much less than the velocity of the air is as follows:

$$(\Delta W/W)_{lim} = (V_{Bf} - V_{Ai})/m_B \qquad (6)$$

From Eq. (6), the largest value of $m_B$ is as follows:

$$m_B = (V_{Bf} - V_{Ai})/(\Delta W/W) \qquad (7)$$

From practical considerations, and assuming that the salinity of the droplets increases by more than, say, 4–5%, the maximum value of $m_B$ is about 0.02. Recalling that $m_B$ is the mixing ratio in terms of kilograms of brine per kilograms of air, the analysis set forth above establishes that, according to the present invention, only a relatively small amount of droplets should be in the air mass. Under these conditions, the initial exchange of energy between the droplets and the air will usually involve a change in enthalpy, because the latent heat flux due to evaporation of water from the droplets into the air mass or the condensation of water vapor in the air mass on the droplets, depending upon the relationship between the initial state of the droplets and the initial state of the ambient air, will usually exceed the sensible heat flux between the liquid droplets and the air. The sum of, or the difference between the two heat fluxes constitutes the energy that forces the temperature of the droplets towards the wet-bulb temperature of the bulk of the air mass.

The process described above, wherein the ratio of droplets to air is relatively small (i.e., less than say 2%) is illustrated in the psychrometric chart of FIG. 2 wherein the mixing ratio at the brine/air interface is plotted as a function of temperature. Curve A represents the variation of mixing ratio for fresh water, and represents the line of 100% humidity. For reference purposes, curves B, C, and D represent lines of constant relative humidity of the air. These lines of constant relative humidity are individually associated with the relative humidity at the brine/air interface of a droplet due to the density of the brine. That is to say, for fresh water, the density is unity, s indicated in FIG. 2, while a 70% relative humidity in air is associated with brine of a density 1.225, where the density of fresh water is 1.0. Similarly, the 50% relative humidity line is associated with brine with a density of 1.305.

Curve E in FIG. 2 represents a line of constant enthalpy (81 Kj/Kg) as well as a line of constant wet-bulb temperature (21° C.); and curve E crosses curves A, B, C, and D. If the starting brine has a density of 1.225, which corresponds to the density of Dead Sea water, and if the end brine has a density of 1.305, which represents the density of end brind suitable for producing potash from Dead Sea water, then the object of the apparatus shown in FIG. 1 is to convert Dead Sea water into end brine suitable for potash production. From actual measurements, it has been established that the surface temperature of Dead Sea water in the summer is about 34° C., and has a partial pressure, at the air/brine interface, such that the mixing ratio is approximately 24.5 grams of vapor per kilogram of air. This establishes the State I shown in FIG. 2 for the brine. Ambient air temperature at the Dead Sea in the summer is around 37° C., and about 25% relative humidity. This establishes State I' for the air, as shown in FIG. 2.

The droplets change state rapidly from State I to State II, with only a relatively small increse in density. A very small change in state of the bulk of the air occurs simultaneously, and this is shown, in exaggerate form, in FIG. 2 as the air changes from State I' to State II'. When the air is at State II', which establishes the wet-bulb temperature of the air, the vapor pressure at the brine/air interface at the droplets will be such that the wet-bulb temperature at the brine/air interface will be the same as the wet-bulb temperature of the air; and then a second process of interaction between the droplets and the air occurs. During this second process, the temperature of the droplets increases as the temperature of the bulk of the air decreases, along the constant wet-bulb temperature line E shown in FIG. 2. The thermal head at the beginning of this process is the difference between the temperature $T_{II'}$, and $T_{II}$. The longer the time that a unit mass of air interacts with the droplets, the smaller will be the temperature difference ($T_{III'} - T_{III}$) between the droplets and the air. The time required for the temperature difference between the droplets and the bulk of the air to reach a value 1/e of the thermal head is termed the time constant of the system, the vlue of which is given by Eq. (2). Thus, whent he parameters of the system, such as the distance through which the droplets fall and the size of the droplets, are selected properly, the resident time of the air interacting with the droplets will approach the time constant of the system; and, in this case, inspection of Eq. (5) reveals that the mixing ratio $m_B$ as a function of $t^*$ is as follows:

$$m_B = 0.67[[\Delta V/(\Delta W/W)] \tag{8}$$

where the time of interaction $t^*$ is approximately equal to the time constant of the system given by Eq. (2).

When $m_B >> 0.02$, which is the usual situation that prevails when spray cooling is carried out in the prior art, the mass of water in the droplets is comparable to the mass of air interacting with the spray. As a consequence, the enthalpy of the air mass interacting with the spray changes considerably as the humidity of the air increases. If this process is carried out over a sufficient length of time, the process will follow a path typically like path F shown in FIG. 2 with the end point being designated point G. Therefore, the conventional approach to evaporation would require a series of steps in order to drive the density of the brine to the final state, in this case, State III.

In the present invention, the resident or interaction time $t^*$ of the air and droplets will approximate the time constant of the system by suitable selection of the size of the droplets (namely their radii) and the size of the shower (namely the height and radius of the shower). From a practical standpoint, it appears that H should exceed about 5 m. and should be less than about 200 m. When the radius of the shower R is large compared with 0.3 H:

$$t^* = [H/g(\Delta T/T)]^{\frac{1}{2}} \tag{9}$$

· For $R < 0.3$ H, $t^* = H/[5Rg(\Delta T/T)]^{\frac{1}{2}}$, where H is the height of the spray head, g is the gravitational constant, $\Delta T$ is the change in air temperature, and T is the absolute temperature of the air. Furthermore, when the interaction time $t^*$ is substantially equal to the time constant of the system, the radius of the droplets is given as follows:

$$r = [(3t^* m_B \rho_A NuK)/2\rho_B]^{\frac{1}{2}} \tag{10}$$

From the above analysis, it can be concluded that the present invention is carried out when the mixing ratio of droplets to air is less than about 2%, and, for the time of interaction to be comparable to the time constant of the system, then, for the height of the spray head to be reasonable, say, in excess of 5 m, the radius of the droplets should be less than about 0.2 mm. In such case, the radius of the spray shower should be less than about 0.3 H in order to take advantage of entrainment of air due to the downdraft.

Applying the above analysis to the concentration of Dead Sea water into an end brine suitable for potash production, the starting and ending brine conditions have been listed in Table I:

TABLE I

| BRINE | WATER [KG] | SALT [KG] | TOTAL | VOL[M³] | DENSITY |
|---|---|---|---|---|---|
| start | 1350 | 450 | 1800 | 1.5 | 1.2 |
| end | 850 | 450 | 1300 | 1.0 | 1.3 |
| change | 500 | 0 | 500 | 0.5 | 0.1 |

For Dead Sea brine:

$V_{Bf} = 13 \times 10^{-3}$ Kg vapor/Kg air, compared with the summer air-vapor mixing ratio of $V_{Ai} = 10 \times 10^{-3}$ Kg vapor/Kg air At noon in the summer, the temperature of Dead Sea water is about 34° C, and the mixing ratio at the air/brine interface is about $24 \times 10^{-3}$ Kg of vapor per kilogram of air. This establishes State I, shown in FIG. 2. At noon in the summer, the air temperature is about 37° C. at about 25% relative humidity, thereby establishing State I', as shown in FIG. 2, for the air. The end brine hs a density of 1.3, and the mixing ratio, at the interface between the air and the brine, is about $13 \times 10^{-3}$ Kg of vapor per kilogram of air.

Using Eq. (8), the selections of spray head nd pump pressure are such that a mixing ratio of approximately 0.006 is achieved in order for the time of interaction between the air and the brine droplets to be of the same order of magnitude as the time constant of the system. Under this condition, the relative humidity of the air is less than the relative humidity at the surface of the end brine, because the relative humidity of the air is about 25%, while the relative humidity t the surface of the end brine is approximately 50%. Therefore, when the droplets interact with the air, the first process that takes place is a rapid change in temperature of the brine, accompanied by evaporation of some of the water thereof. The enthalpy of the brine surface changes to a very large extent. This change, however, is not reflected in the enthalpy of the air which remains substantially at the same level because $m_B$ is very small. The first process terminates when the temperature of the droplets approaches the wet-bulb temperature of the bulk of the air. When the brine reaches State II, as shown in FIG. 2, the wet-bulb temperature at the brine/air interface is substantially equal to the wet-bulb temperature of the bulk of the air. The temperature difference between the droplets and the bulk of the air constitutes the thermal head available for effecting concentration of the brine.

The second process then follows, wherein the brine droplets are warmed as the bulk of the air is cooled, the latent heat flux being substantially equal to the sensible heat flux, and the transfer of energy occurring under conditions of constant enthalpy along a constant wet-bulb temperature line. By selecting the radius of the droplets and the height of the spray head such that the time of interaction is comparable to the time constant of the system, the density of the brine droplets will increase to State III, as shown in FIG. 2, as the bulk of the air changes from State II' to State III'.

The following is an example of specific apparatus according to the present invention for converting Dead Sea water to end brine bsed on atmospheric conditions at noon in the summer.

EXAMPLE I

| $m_B = 0.006$ | $H = 100$ m | $r = 0.1$ mm | $t^* = 30$ sec | |
|---|---|---|---|---|
| DROPLETS | | | | |
| State | Density | Temp. | WB Temp. | Enthalpy [Kj/Kg] | Mix Ratio |
| I | 1.225 | 34° C. | 29° C. | 116 | $24 \times 10^{-3}$ |
| II | 1.228 | 26° C. | 21° C. | 81 | $15 \times 10^{-3}$ |
| III | 1.305 | 30° C. | 21° C. | 81 | $13 \times 10^{-3}$ |
| AIR BULK | | | | |
| State | Rel. Hum. | Temp. | WB Temp. | Enthalpy [Kj/Kg] | Mix Ratio |
| I' | 25% | 37° C. | 21° C. | 81 | $10 \times 10^{-3}$ |
| II' | 25% | 37° C. | 21° C. | 81 | $10 \times 10^{-3}$ |
| III' | 40% | 33° C. | 21° C. | 81 | $12 \times 10^{-3}$ |

From the data of Table I, about 3,000 kilograms of Dead Sea water must be pumped through a head of about 120 m. (including the head across the nozzles) to produce about 2,000 kilograms of concentrated brine. The electrical requirements for pumping this head is about 1.2 kilowatts for a pumping efficiency of about 80%. Thus, the amount of power required to produce the concentrated brine is minimal.

While the brine is described as being pressurized and sprayed through nozzles, other types of spray-producing heads can be utilized to produce the required droplet size. For example, rotating discs or piezoelectric sprayers can be used.

The analysis of the brine shower detailed above neglects, for simplicity of the analysis, the effect of horizontal wind on the shower when the process is carried out in the open air. Actually, the presence of wind with a horizontal component will introduce dry air into the shower the enhancing evaporation and making the shower more effective.

The downward motion within a shower is controlled by two parameters: the temperature drop and the mixing ratio. When the shower is narrow (i.e., the ratio of its radius to its height is less than about 0.3), the vertical motion is controlled by the radius of the shower. When the shower is wide, downward motion is controlled by the height of the shower and buoyancy forces. It can be shown that for a wider shower, for a mixing ratio $m_B^* = m_B/(\Delta T/T)$, where $m_B^*$ is in the range 0.2 and 0.5, the ratio of shower radius to height should be about unity producing a plume height at exit less than the shower height. For a narrow shower, the exit plume will be comparable to the radius of the shower.

In the event that the pervailing winds have a preferential direction, line showers such as shown in Fig. 1A may be utilized to advantage. A plurality of towers 200 are erected in a direction that is normal to the direction of the prevailing wind. At present the preferred height is about 30 m. although the actual height will depend upon the wind speed and downwind geography. Conduits 201 are strung between the towers; and brine to be concentrated is pumped through the conduits which have a plurality of spray nozzles through which sprays of dilute brine are intorduced into the prevailing wind. Under the atmospheric conditions described above, some 2 million tons of water will be evaporated from a line shower 1Km. long where the average wind speed is about 5 m/second and operation is about 4000 hours.

In actual practice, a line shower was constructed in accordnce with the present invention at Beit Haarava, north of the Dead Sea. The towers are 12 m. high and extend for 40 m. The pumping rate is 20 $m^3$/hr of Dead Sea brine. A series of brine collectors downwind of the line of towers were distributed up to 100 m. from the line of towers. From actual measurements, 30% of the water in the brine was evaporated, and the difference between the final brine temperature and the final air temperature was of the order of 1° C..

While the description above relates almost exclusively to concentrating brine, the present invention is generally applicable to concentrating other solutions, and particularly to concentrating solutions containing heat sensitive materials such as food products, or to precipitating solids from such solutions because the present inventio does not involve external heating of the gaseous medium contacted with the solution. Rather, the invention relies upon the internal heat content present in the gaseous medium by reason of its natural condition. Spraying the solution to be concentrated into air or other gaseous medium requires sufficient space for the spray droplets to spend adequate time interacting with the gaseous medium in the manner described above. In addition, if the gaseous medium is ambient air subject ot the vagaries of wind speed and direction, spray droplets are subject to being carried downwind beyond the region of desired containment for the concentrated solution. Sometimes this is a problem; and to solve this problem, the embodiment of the invention shown in FIGS. 3-5 can be utilized.

In this embodiment, the solution to be concentrated is presented to the gaseous medium as a thin film carried by many filaments exposed to a moving mass of ir. As shown in FIG. 3, apparatus 100 for concentrating a starting solution to an end solution comprises a plurality of planar pads 102 stacked parallel to each other but in spaced relationship, and positioned normal to the direction of gas flow as indicated by reference numeral 104. Pads 102 are vertically oriented and their lower ends terminate in basin 106 containing the end solution. A header arrangement (not shown) supplies dilute solution to the upper ends of the pads, and the dilute solution travels downwardly through the pads.

The pads may be matted jute or other fibrous material, or randomly crossing filaments; but, preferably, they are in the form of a plurality of planar criss-crossed nets of thin filaments of jute or solid plastic. For reference purposes, such pads are referred to hereinafter as matrices of filaments over which the solution flows from to to bottom. This arrangement confines the solution, in both its dilute and concentrated form, to a limited spatial location thus avoiding the problem of drifting associated with spraying droplets into ambient air.

Several constraints exist for optimizing the concentration of the solutions applied to the matrices of filaments. First, the vapor pressure of the gaseous medium to which the thin film of solution is exposed should have a vapor pressure that is less than the vapor pressure at the liquid/gas interface of the end solution. This will ensure evaporation of the solvent. Secondly, the film should interact with the gaseous medium such that practically all of the heat and vapor transfers occur under the condition that the latent heat flux due to evaporation of liquid from the film is substantially equal to the sensible heat flux due to heating of the gaseous medium, whereby the wet-bulb temperature at the liquid/gas interface of the film is substantially constant and equal to the wet-bulb temperature of the bulk of the gaseous medium. Under these conditions, most of the solution will evaporate under conditions of constant enthalpy as in the cse of the first described embodiment.

Optimization of the parameters associated with the use of matrices to establish a thin film configuration for an evaporator involves optimizing the relationship between the ratio of temperature differences ($\theta_1$ and $\theta_2$) of the gas and liquid at opposite outer surfaces of the matrices, the drag coefficient $c_f$ of the matrices, and the areal ratio $a^*$. For reference purposes, $\theta_1$ is the temperature difference between the gaseous medium and the liquid at the upwind surface of the matrix, $\theta_2$ is the temperature difference at the downwind surface, and $a^*$ is the ratio of the projected area of the filaments of the matrices to the the area of the matrix itself.

Referring to FIG. 4, the pressure drop del p across the matrix 102 is:

$$\text{del } p = \tfrac{1}{2}\rho_a[U_1^2 - U_d^2] \qquad (11)$$

$$= (\rho/2)c_f a \times U_d^2$$

where $\rho_a$ is the density of the gaseous medium $U_d$ is the downwind gas speed $U_i$ is the upwind gas speed The heat flux from the gaseous medium to the solution can be written, based on the Reynolds analogy that the heat transfer is proportional to the ratio of the change in pressure across a matrix to the upwind gas speed, as follows:

$$dq = (\rho_a)(c_p)(k/v)(c_f/2)(U_d)(\theta)(da^*) \qquad (12)$$

where $c_p$ is the specific heat v is the kinematic viscosity of the gas k is the heat conductivity of the gas $\theta$ is the temperature difference between the gs and the liquid $da^*$ is the variation in the areal ratio element associated with a matrix of width dB $T_a$ is the gas temperature $T_b$ is the solution temperature Assuming that the solution temperature remains almost constant in the direct of gas flow through the matrices (see FIG. 5), eq. (11) and (12) can be combined and simplified to provide the following relationship:

$$d\theta/\theta = -(kc_f/2v)da^* \qquad (13)$$

Integrating eq. (13) gives:

$$\ln\theta/\theta = (k/2v)(c_f)(a^*) \qquad (14)$$

Rewriting and combining yields:

$$q = (\rho_a)(c_p)(U_d)(\theta_1 - \theta_2) \text{ watts/m}^2 \qquad (15)$$

Introducing $U_d$ from eq. (12) yields:

$$q = [(\rho_a)(c_p)(U_d)(\theta_1)][1+(2v/k)\ln\theta_1/\theta_2]^{-1}[1-\theta_2/\theta_1] \qquad (16)$$

In commercial applications, q should be maximized for a given gas speed and solution conditions. Assuming that the rate of solution flow is small as compared with the flow rate of gas across the matrices (say 1:100), the gas and the liquid interface will be at constant enthalpy (wet bulb). Thus, the temperature of the solution, measured vertically, will vary slowly along the wet-bulb temperature line as the solution is concentrated.

Considering air as the gaseous medium, and brine s the solution to be concentrated, trial solutions of eq. (16) to maximize q yields the following:

$$\theta_1/\theta_2 = 2.5$$

$$(c_f)(a^*) = 1.28$$

For example, if the air speed is 4 m/sec, the air temperature is 35° C. and its humidity 25%, and the brine temperature is 31° C. (its vapor pressure is 35% of water), optimization in accordance with the above discussion yields the following results:

$$U_d = 2.6 \text{ m/sec}$$

$$\theta_2 = 1.620 \text{ C.}$$

Each kilogram of air flowing across the matrices exchanges about 2520 Joules which is equivalent to the latent heat of evaporation of 1 gram of water. Assuming fibers of 1mm diameter, the Reynolds number is 173. For this Reynolds number, $c_f$ is about 3; and $a^*$ is about 0.40.

Matrices 102, as shown in FIG. 6, are preferably in the form of planar screen 107 comprising criss-crossed, interwoven filaments 108, 109. From experimental studies, it is presently believed that screen 107 should have a porosity p of about 60%, where the term porosity means the ratio of open area of the screen to its total area. For reference purposes, $p = 1 - a^*$.

When brine, such as sea water is the starting solution, a flow rate of brine in excess 10 cm³ per second per m² of screen tends to cause the brine to bridge the interstices in the screen thereby suppressing air flow through the screen. Bridging of the interstices considerably reduces the evaporation efficiency and is undesirable for this reason.

Under arid conditions with strong winds, the evaporation rate can be as high as 7 gm/sec per m² of screen. For a 5 m² screen, some 35 grams of water could be evaporated per second; and if the residual liquid for the end brine is about 20% of the evaporated water, about 40 grams per second per m² would have to be supplied. A flow rate of this magnitude will cause bridging of the interstices to occur; and the available evaporation rate could not be achieved.

One approach to solving this problem is to use a network of pipes to distribute the starting solution over the area of the screen, particularly along the vertical dimension of the screen. This not only increases the cost of the installation, but gives rise to another and more insidious problem: a nonuniform distribution of brine when the flow rate is small. That is to say, when the flow rate is small, "channels" of brine develop along the screen, and some regions remain dry.

According to the present invention, this problem is solved by intermittently applying the starting solution to a screen of filaments that have the capacity to absorb the solution. Such filaments are termed hereinafter fibers. The starting solution is applied in pulses whose duty cycle is such that the the screen is supplied, on the average, with the required amount of solution. In the example given above, the application of pulses of brine of say 25% to 50% higher than the amount required, proves to be adequate. The large amount of solution in the pulse flows evenly over the screen bridging the interstices for a short period of time, and saturating the fibers. Before the next pulse is applied, the interstices clear and evaporation proceeds as the solution is drawn from the fibers to support the evaporation.

The brine content b of the saturated fibers is typically about 0.5 kg/m$^2$; and the height h of the screen is typically about 5 m. The water content $m_E$ that is to be evaporated is typically 0.7b for a starting solution of sea water, and 0.2b for hygroscopic brine. The amount of brine $P_b$ in each pulse is $(m_E)(h)$ kg. Assuming a flow rate of 0.1 kg/m-sec, a pulse duration of about 20 seconds will be required; and if, on the average, the screen evaporates 3 gm/sec-m$^2$, the interval between pulses should be about 2 minutes for sea water as the starting solution. This is a duty cycle of about 15%. For concentrated brine, the rate of evaporation is only about 1 gm/sec-m$^2$ and $m_E$ is about 100 gm. In this case, the interval between pulses should be about 100 seconds, while each pulse should contain only about 1000 gm. per m.

Apparatus in accordance with this aspect of the invention is shown in FIG. 6 wherein net 107 comprises a criss-crossed net of filaments 108, 109. Preferably, the filaments are fibers that have the ability to absorb liquid. Jute is an example of a suitable type of fiber. Starting solution in reservoir 110 is applied to net 108 throough modulatable valve 111 whose operation is under the control of timer 112. When a pulse of solution is applied to the net, the solution uniformly spreads over the net wetting the surface evenly and bridging the interstices as the fibers are saturated. After a short period of time, the interstices are unbridged as indicated by the dashed lines in FIG. 7, and the liquid absorbed in the fibers is drawn out as the evaporation process takes place.

Intensification of evaporation can be achieved by using a blower to force dry air through the matrices. The expenditure of energy for this purpose does not significantly increase the cost because only about 2.4 Joules of electrical energy will be required to evaporate 1 gram of water.

This embodiment of the invention can also be carried out in the open air much as disclosed in connection with the brine shower. In such cse, environmental air is the gaseous medium, and the prevailing wind provides the motive force for the air to pass through the matrix. In order to maximize the efficiency of the evaporation process, the rate at which starting solution is applied to the matrix can be related to the wind speed. That is to say, the stronger the wind, the higher will be the rate of evaporation so that the rate of starting solution will be increased to take advantage of the more favorable conditions. To this end, the arrangement shown in FIG. 7 can be used. As shown, a wind speed sensor, which is entirely conventional, senses the wind speed and controls the opening of a modulatable vlve that connects the reservoir of dilute brine, for example, to a plurality of matrices like those shown in Fig. 3. When the wind speed increases, and more dry air at a higher speed interacts with the film on the matrix, the sensor detects such condition and operates on the valve to increase the rate at which liquid is applied to the matrix. When the wind speed decreases, the opposite occurs.

As previously described, this aspect of the present invention is applicable to evaporating solutions other than brine and will be particularly useful in evaporating heat solutions containing heat sensitive materials.

It is believed that the advantages and improved results furnished by the method and apparatus of the present invention are apparent from the foregoing description of the preferred embodiment of the invention. Various changes and modifications may be made without departing from the spirit and scope of the invention as described in the claims that follow.

I claim:

1. A method for concentrating a starting solution by evaporation to produce an end solution comprising contacting said starting solution with a gaseous medium under the conditions that:
   (a) the heat content of the starting solution in contact with the gaseous medium is smaller than the heat content of the gaseous medium;
   (b) the duration of contact is such that most of the evaporation of solution takes place under conditions of constant enthalpy; and
   (c) the vapor pressure of the gaseous medium is less than the vapor pressure of the liquid/gas interface of the end solution.

2. A method according to claim 1 wherein the starting solution is an aqueous one.

3. A method according to claim 2 wherein the starting solution is sprayed into the medium.

4. A method according to claim 2 wherein the starting solution is brine.

5. A method according to claim 2 wherein the medium is air.

6. A method according to claim 5 including practicing the method in the open air.

7. A method according to claim 6 including spraying the solution into the air from a conduit suspended between towers.

8. A method according to claim 2 wherein the starting solution is brine, the medium is air, and the mass mixing ratio of brine to air is less than about 0.02.

9. A method according to claim 8 wherein the duration of contact is no less than about the time required for the temperature difference between the brine and the air to reach about 37% of the thermal head which is the difference between the temperature of the brine and the temperature of the bulk of the air when the temperature of the air/brine interface and the temperature of the bulk of the air reach the same wet bulb temperature.

10. A method according to claim 8 including the step of pumping the brine to a predetermined elevation above the ground before spraying the brine into the air, the droplet radius being less than about 0.2 mm.

11. A method according to claim 10 wherein said predetermined elevation is greater than about 5 m.

12. A method according to claim 11 wherein said predetermined elevation is less than about 100 m.

13. A method according to claim 12 including the step of collecting the brine after it falls through said predetermined elevation.

14. A method for harvesting potash from a brine containing potash and salts using the method of claim 13.

15. A method according to claim 8 wherein the initial latent heat flux is greater than the initial sensible heat flux until the temperature of the air/brine interface approaches the wet-bulb temperature of the air.

16. A method according to claim 1 for concentrating a starting solution to an end solution comprising the steps of:
   (a) spraying droplets of the starting solution into said gaseous medium to form a shower within which heat and vapor transfers take place; and
   (b) interacting the droplets with a gaseous medium such that practically all of the heat and vapor transfers occur under the condition that the latent heat flux due to evaporation of liquid from the droplets is substantially equal to the sensible heat flux to the droplets from the gaseous medium, whereby the wet-bulb temperature at the liquid/gas interface of the droplets is substantially constant and equal to the wet-bulb temperature of the bulk of the gaseous medium.

17. A method according to claim 16 wherein the starting solution is brine, the end solution is a more concentrated brine, and the gaseous medium is air.

18. A method according to claim 17 wherein the mass mixing ratio of the brine to air is less than $(V_{Bf}-V_{Ai})/[(W_{Bf}-W_{Bi})/W_{Bf}]$ were $V_{Bf}$ is the vapor mixing ratio at the air/brine interface of the end brine, $V_{Ai}$ is the vapor mixing ratio of the air entering the shower, $W_{Bf}$ is the amount of water in the end brine, and $W_{Bi}$ is the amount of water in the starting brine.

19. A method according to claim 18 wherein the mixing ratio is less than about 0.02.

20. A method according to claim 17 wherein the size of the droplets and the size of the shower are selected such that the resident time t of the air is approximately equal to $\tau$, which is the time required for the temperature difference between the brine and the air to reach about 37% of the thermal head, which is the temperature difference between the brine and the bulk of the air when the air/brine interface and the bulk of the air come to the same wet-bulb temperature.

21. A method according to claim 20 wherein the radius of the droplets is less than about 0.2 mm.

22. A method according to claim 1 for concentrating a starting solution to an end solution comprising the steps of:

(a) flowing a thin film of said starting solution over a matrix of filaments exposed to said gaseous medium; and (b) interacting the solution with a gaseous medium such that practically all the heat and vapor transfers occur under the condition that the latent heat flux due to evaporation of liquid from the solution is substantially equal to the sensible heat flux to the thin film from the gaseous medium, whereby the wet-bulb temperature at the liquid/gas interface of the solution is substantially constant and equal to the wet-bulb temperature of the bulk of the gaseous medium.

23. A method according to claim 22 wherein the starting solution is brine, the end solution is a more concentrated brine, and the gaseous medium is air.

24. A method according to claim 23 wherein the mass flow of air is larger than the mass flow of brine.

25. A method according to claim 24 wherein the product of the drag coefficient of the matrix and the areal ratio of the matrix is about 1.28.

26. A method according to claim 24 wherein the thickness of the matrix normal to the direction of gas flow is such that the ratio of the difference between the gas temperature and the solution temperature across the matrix is about 2.5.

27. A method according to claim 22 including measuring a parameter functionally related to the speed of the gaseous medium relative to the matrix, and controlling the rate at which starting solution is applied to the matrix in accordance with said parameter.

28. A method according to claim 22 wherein the matrix is a planar, criss-crossed net of filaments, and the starting solution is intermittently applied to the matrix in pulses.

29. A method according to claim 28 wherein the solution is brine and the gaseous medium is air.

30. A method according to claim 28 wherein the filaments are fibers that absorb liquid.

31. A method according to claim 28 wherein the areal ratio of the matrix is about 40%.

* * * * *

UNITED STATES PATENT AND TRADEMARK OFFICE
CERTIFICATE OF CORRECTION

PATENT NO. : 4,704,189

DATED : May 11, 1984

INVENTOR(S) : G. ASSAF

It is certified that error appears in the above-identified patent and that said Letters Patent is hereby corrected as shown below:

At column 2, line 13, change "exist" to ---exists---.

At column 2, line 14, change "cse" to ---case---.

At column 2, line 15, change "of" to ---or---.

At column 2, line 17, change "enought" to ---enough---.

At column 2, line 57, change "latend" to ---latent---.

At column 3, line 15, change "intnermittently" to ---intermittently---.

At column 4, line 54, change "hed" to ---head---.

At column 4, line 57, change "hed" to ---head---.

At column 6, line 3, change "kilograms of air" to ---kilogram of air---.

At column 6, line 43, change "brind" to ---brine---.

At column 6, line 57, change "increse" to ---increase---.

At column 7, line 4, change "$T_{II'1}$ and $T_{II}$" to ---$T_{II'}$ and $T_{II}$---.

At column 7, line 11, change "vlue" to ---value---.

At column 7, line 11, change "whent he" to ---when the---.

UNITED STATES PATENT AND TRADEMARK OFFICE
CERTIFICATE OF CORRECTION

PATENT NO. : 4,704,189  Page 2 of 3

DATED : May 11, 1984

INVENTOR(S) : G. ASSAF

It is certified that error appears in the above-identified patent and that said Letters Patent is hereby corrected as shown below:

At column 8, line 23, change "hs" to ---has---.
At column 8, line 26, change "nd" to ---and---.
At column 8, line 34, change "t" to ---of---.
At column 8, line 67, change "bsed" to ---based---.
At column 9, line 36, change "the" to ---thus---.
At column 9, line 51, change "pervailing" to ---prevailing---.
At column 9, line 61, change "intorduced" to ---introduced---.
At column 9, line 67, change "accordnce" to ---accordance---.
At column 10, line 14, change "inventio" to ---invention---.
At column 10, line 23, change "ot" to ---to---.
At column 10, line 31, change "ir" to ---air---.
At column 10, line 45, change "pluraity" to ---plurality---.
At column 10, line 49, change "to" (first occurrence) to --top---.
At column 11, line 2, change "cse" to ---case---.

UNITED STATES PATENT AND TRADEMARK OFFICE
CERTIFICATE OF CORRECTION

PATENT NO. : 4,704,189

DATED : May 11, 1984

INVENTOR(S) : G. ASSAF

Page 3 of 4

It is certified that error appears in the above-identified patent and that said Letters Patent is hereby corrected as shown below:

At column 11, line 34, change "v" to ---$\vee$---.

At column 11, line 36, change "gs" to ---gas---.

At column 11, line 39, change "dB" to ---B---.

At column 11, line 43, change "direct" to ---direction---.

At column 11, line 58, change "$C_R$-" to ---$C_p$---.

At column 12, line 1, change "s" to ---as---.

At column 12, line 62, delete "the" (first occurrence).

At column 13, line 19, change "m" to ---$m^2$---.

At column 13, line 25, change "108 throough" to ---107 through---.

At column 13, line 42, change "cse" to ---case---.

At column 13, line 54, change "vlve" to ---valve---.

UNITED STATES PATENT AND TRADEMARK OFFICE
CERTIFICATE OF CORRECTION

PATENT NO. : 4,704,189

DATED : May 11, 1984

INVENTOR(S) : G. ASSAF

Page 4 of 4

It is certified that error appears in the above-identified patent and that said Letters Patent is hereby corrected as shown below:

At column 15, line 15, change "were" to ---where---.

Signed and Sealed this

Twenty-third Day of August, 1988

Attest:

DONALD J. QUIGG

*Attesting Officer*

*Commissioner of Patents and Trademarks*